(12) United States Patent
Pencheon (10) Patent No.: US 11,726,001 B2
(45) Date of Patent: Aug. 15, 2023

(54) COLOR RELEASING TOILET OVERFLOW INDICATOR

(71) Applicant: Vance Roy Pencheon, Basseterre (KN)

(72) Inventor: Vance Roy Pencheon, Basseterre (KN)

( * ) Notice: Subject to any disclaimer, the term of this patent is extended or adjusted under 35 U.S.C. 154(b) by 1279 days.

(21) Appl. No.: 16/132,526

(22) Filed: Sep. 17, 2018

(65) Prior Publication Data
US 2019/0086288 A1 Mar. 21, 2019

Related U.S. Application Data

(60) Provisional application No. 62/558,899, filed on Sep. 15, 2017.

(51) Int. Cl.
*G01M 3/22* (2006.01)
*E03D 5/02* (2006.01)
*E03D 11/00* (2006.01)
*E03C 1/24* (2006.01)

(52) U.S. Cl.
CPC ............ *G01M 3/224* (2013.01); *E03D 5/026* (2013.01); *E03C 2001/2406* (2013.01); *E03D 11/00* (2013.01); *E03D 2201/00* (2013.01)

(58) Field of Classification Search
CPC ........ G01M 3/224; E03D 5/026; E03D 11/00; E03D 2201/00; E03C 2001/2406
See application file for complete search history.

(56) References Cited

U.S. PATENT DOCUMENTS

| 1,621,737 A | * | 3/1927 | Moore | E03D 9/037 |
| | | | | 4/225.1 |
| 3,311,931 A | * | 4/1967 | Toft | E03D 9/037 |
| | | | | 4/225.1 |
| 4,467,480 A | * | 8/1984 | Keller | E03D 9/037 |
| | | | | 4/225.1 |
| 5,918,320 A | * | 7/1999 | Reals | E03D 9/02 |
| | | | | 4/225.1 |
| 9,909,295 B2 | * | 3/2018 | Brackett, Sr. | E03D 11/00 |
| 10,465,366 B2 | * | 11/2019 | Grover | A47K 13/26 |
| 2004/0043914 A1 | * | 3/2004 | Kaziska | C11D 17/0056 |
| | | | | 510/383 |
| 2010/0146687 A1 | * | 6/2010 | King | E03D 9/037 |
| | | | | 4/225.1 |
| 2015/0059074 A1 | * | 3/2015 | Davies | E03D 1/00 |
| | | | | 4/314 |
| 2016/0369489 A1 | * | 12/2016 | Butler | E03C 1/046 |
| 2017/0211266 A1 | * | 7/2017 | Galligar | E03D 9/031 |
| 2017/0247869 A1 | * | 8/2017 | Soller | E03D 9/032 |
| 2019/0360187 A1 | * | 11/2019 | Aldridge | E03D 9/038 |

FOREIGN PATENT DOCUMENTS

WO WO2021064432 * 4/2021 ............ G01F 23/223

* cited by examiner

*Primary Examiner* — J C Jacyna
(74) *Attorney, Agent, or Firm* — Gutwein Law; Tyler B. Droste (57) ABSTRACT

A device adapted for installation onto a toilet overflow pipe to indicate a leaking condition of a toilet flush valve. The device having a stem portion with a diameter configured for receipt within an interior diameter of a toilet overflow tube. The device including a housing forming a reservoir for collection of water prior to entering the overflow tube. The reservoir including a cavity for the placement of a water soluble pigment, wherein the pigment is dissolved within water in the housing and into the overflow tube. An alternate embodiment of the device, includes a stay member configured to support a ball float member in an off condition.

6 Claims, 7 Drawing Sheets

COLOR RELEASING TOILET OVERFLOW INDICATOR

CROSS REFERENCE TO RELATED APPLICATIONS

This application claims priority to U.S. Provisional Patent Application No. 62/558,899 filed 15 Sep. 2017 to the above named inventor, and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The invention relates generally to a toilet overflow indicator that releases a colored material and combination ball float stay.

BACKGROUND

Generally the most important safety feature within a toilet assembly is the flush valve overflow pipe. The overflow pipe is required by plumbing codes and provides an outlet for overflowing water within a toilet tank to prevent water from exiting the tank interior. In the event of a failed flush valve, the water flow does not completely shut off at the end of a flush cycle, wherein the overflow pipe directs the water into a toilet bowl and out of a toilet drain line. This continual or excess flow of water into the overflow pipe is wasteful and costly. Typically, this type of leak is generally very slow, quiet, and not easily detected.

Currently there exist some solutions to indicate to a user if a toilet valve is in a leaking condition. A first solution utilizes an acoustic sensor to detect a leak though audible cues, but this solution fails to meet the needs of the market as it requires a power source and is visible on an exterior surface of the toilet tank. A second solution requires vigilance by a user, but this solution fails to meet the needs of the market because a user may not hear a leak or may be absent when a leak occurs. A third solution attempts to notify a user to a leaking condition through a pigment added to the water within the tank, but this solution also fails to meet market needs because the tank water color is also unnecessarily changed resulting in a quick dispersal of the pigment during use. Further, some pigments may unnecessarily breakdown the interior components of the toilet.

Therefore, there is a need within the market for an improved leak detection apparatus that does not require a power source, vigilance by a user, and does not color the entire contents of a toilet tank.

SUMMARY OF THE INVENTION

It would be advantageous to have an apparatus that alerts users of a toilet to an overflow condition caused by a faulty fill valve. The apparatus of the present disclosure is configured to collect a substantial amount water that enters the overflow pipe during a leaking condition of the fill valve. The apparatus is configured for placement on an upper portion of the overflow pipe in a nested installation.

Accordingly, the leak indicating device of the present disclosure is configured for placement on an upper portion of a toilet overflow tube within a toilet tank and generally coupled to the various internal components of a flush assembly. The device comprising a generally cylindrical stem portion extending a height from an upper end to a lower end and having a diameter configured for nested receipt within a diameter of the overflow tube.

The upper end of the stem portion includes a housing configured as a reservoir forming a cavity for the capture of water from within the toilet tank interior prior to entry into the overflow tube. The reservoir of the housing defined by a pair of opposed side walls defining an interior side and an exterior side and a bottom side and a top side opposite the bottom side.

An aperture is positioned on the housing on the reservoir interior side adjacent to the bottom side and aligned with an interior of the overflow tube. The aperture is in fluid communication with the reservoir and the interior of the overflow tube, wherein water within the reservoir is directed through the aperture and into the overflow tube.

The top side of the housing includes a cover member configured for placement on the top side to generally protect the contents of the reservoir from dispersal within the toilet tank. The cover member having a plurality of apertures and resembling a grate allowing for the entry of fluid from the tank into the reservoir and enter the overflow tube when the fluid level exceeds the height of the housing.

A pigment is received in the reservoir and placed at the bottom for dissolution into a fluid, such as water, within the toilet tank for dispersal through the aperture. The pigment is selected from a material that is a means for quickly coloring a fluid, wherein the pigment is dissolved into fluid to indicate a leaking condition by coloring the water within the toilet bowl.

In an alternate embodiment of the present disclosure, the housing includes a stay member. The stay member configured to support a ball float assembly in a raised and closed position. The stay member having a vertical portion and horizontal portion with the horizontal portion forming a ledge sized for the resting support of the ball float. The stay member vertical portion extending parallel to the overflow tube and the horizontal portion extending perpendicular to the overflow tube in a modified "L-shape," wherein the traditional "L-shape" is rotated clockwise ninety degrees to form the modified "L-shape" of the stay member.

Generally, it is an advantage of the invention to provide a color releasing toilet overflow indicator that does not suffer from any of the problems or deficiencies associated with prior solutions and that is configured for ease of use.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

The following detailed description includes references to the accompanying drawings, which form a part of the detailed description. The drawings shows, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention of the present disclosure is most generally related to a color releasing toilet overflow indicator that is configured for receipt on an upper portion of an overflow tube of a toilet assembly. The device is provided in a single unit and designed for ease of use, wherein installation of the device can be completed without significant modification or effort within an existing toilet assembly.

The function of the device of the present disclosure is configured to collect every drop of water that enters the overflow pipe, wherein it will pass through a pigment within the device interior. Accordingly, when a leak develops due to a faulty fill valve, the water entering a toilet bowl through the overflow pipe will be colored, indicating to the user there is an overflow without coloring all of the water within a toilet tank.

Referring to the figures, FIG. 1 to FIG. 7 show the leak indicating device and apparatus of the present disclosure and generally referred to as device 10. The device 10 is configured for placement on an upper portion of a toilet overflow tube 1 within a toilet tank generally coupled to the various internal components of a flush assembly. The device 10 comprising a generally cylindrical stem portion 100 extending a height from an upper end 101 to a lower end 102 and having a diameter configured for nested receipt within a diameter of the overflow tube 1. Typically, the overflow tube 1 has a one inch (1 in.) diameter, wherein the diameter of the stem portion 100 is slightly less than one inch (1 in.) to ensure a secure nested receipt.

The upper end 101 of the stem portion 100 includes a housing 110 configured as a reservoir forming a cavity for the capture of water from within the toilet tank interior prior to entry into the overflow tube 1. The reservoir within the housing 110 defined by a pair of opposed side walls defining an interior side 1111 and an exterior side 1112 and a bottom side 1113 and a top side 1114 opposite the bottom side 1113. The interior side 1111 adjacent to an interior of the overflow tube 1, wherein the interior side 1111 wall is flush with the interior diameter of the overflow tube 1. The bottom side 1113 providing resting support for the housing 110 on an upper portion of the overflow tube 1.

An aperture 112 is positioned on the housing 110 interior side 1111 adjacent to the bottom side 1113 and aligned with an interior of the overflow tube 1. The aperture 112 in fluid communication with the reservoir and the interior of the overflow tube 1, wherein water within the reservoir of the housing 110 is directed through the aperture 112 and into the overflow tube 1.

The top side 1114 of the housing 110 includes a cover member 113 configured for placement on the top side 1114 to generally protect the interior contents of the reservoir from dispersal within the toilet tank. The cover member 113 having a plurality of apertures and resembling a grate allowing for the entry of fluid from the tank into the reservoir and into the overflow tube 1 when the fluid level exceeds the height of the housing 110.

A pigment 114 is received in the reservoir 111 of the housing 110 and placed at the bottom 1113 for dissolution into a fluid, such as water, within the toilet tank for dispersal through the aperture 112. The pigment 114 can be a granular, a liquid, or a solid material that is a means for quickly coloring a fluid, wherein the pigment 114 is dissolved into fluid entering the housing 110 through the cover member 113 to indicate a leaking condition. Accordingly, the pigment 114 is water soluble for dispersal into the water that may enter the housing 110.

Preferably, the housing 110 is cylindrical in shape and sized for resting receipt on the overflow tube 1 upper portion. The preferred housing 110 circumference is larger than the overflow pipe 1.

Figure 1:
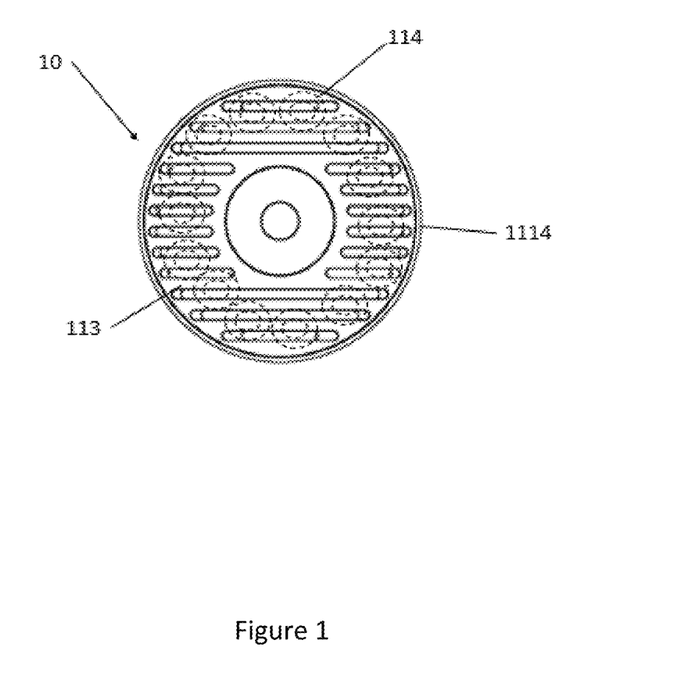
FIG. 1 shows a top view of the device, according to the present disclosure.
Figure 2:
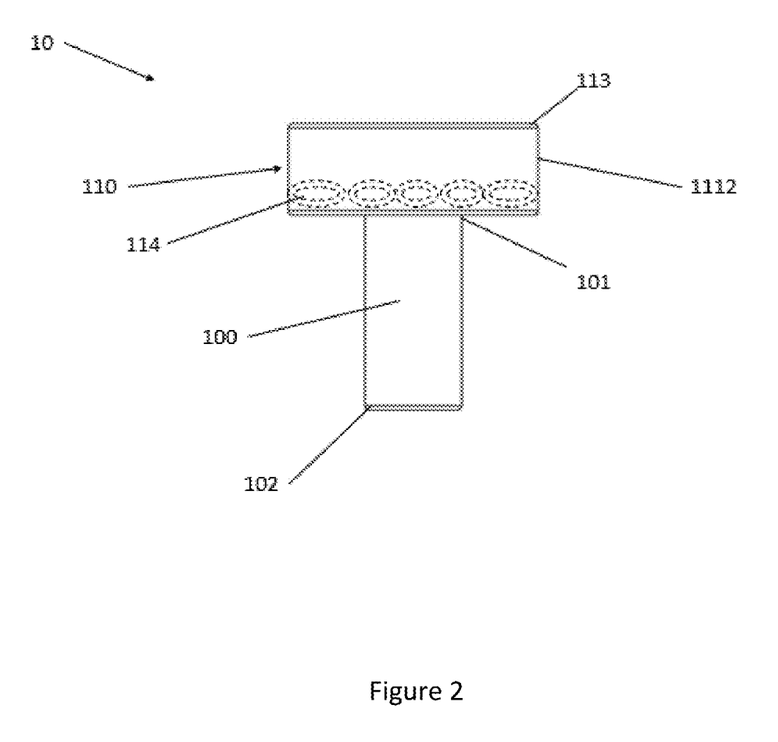
FIG. 2 shows a side view of device, according to the present disclosure.
Figure 3:
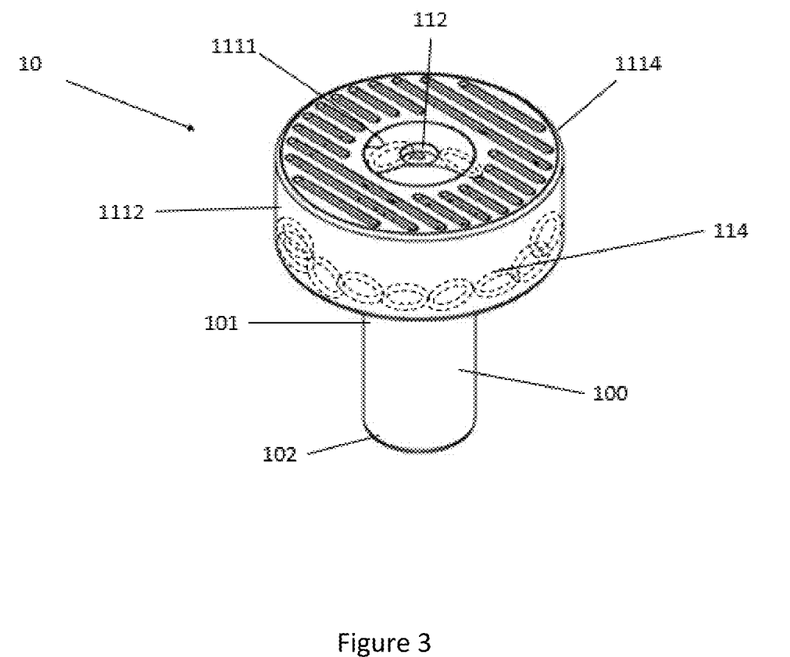
FIG. 3 shows an isometric view of device, according to the present disclosure.
Figure 4:
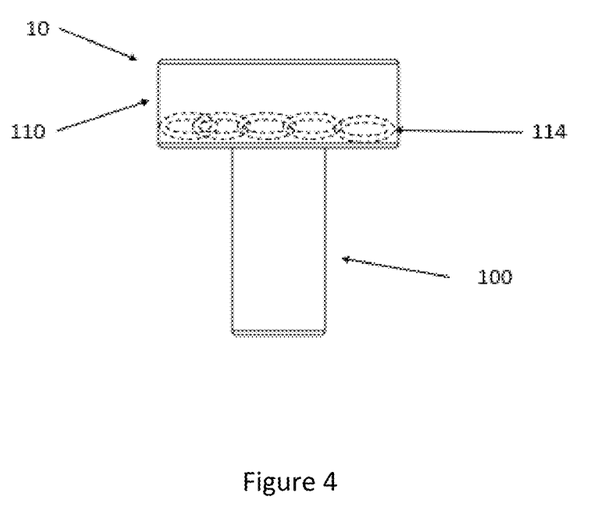
FIG. 4 shows a front view of device, according to the present disclosure.
Figure 5:
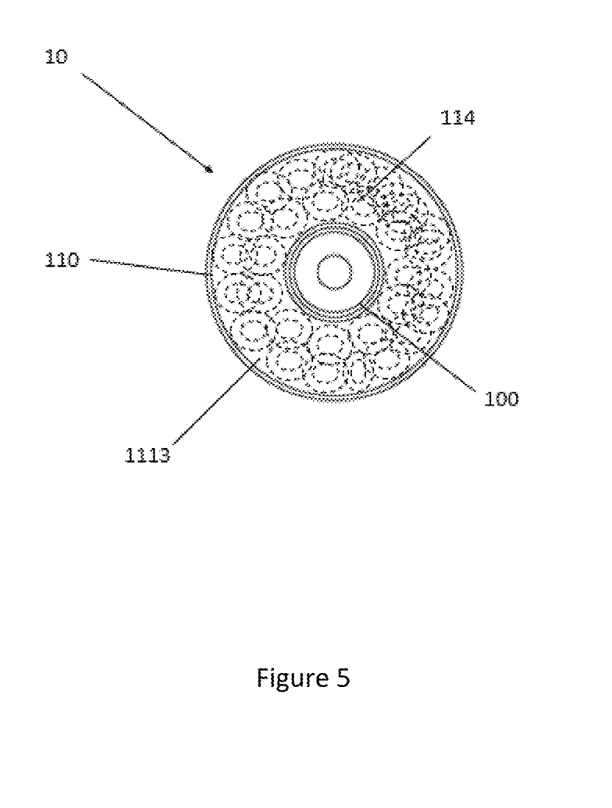
FIG. 5 shows a bottom view of device, according to the present disclosure.
Figure 6:
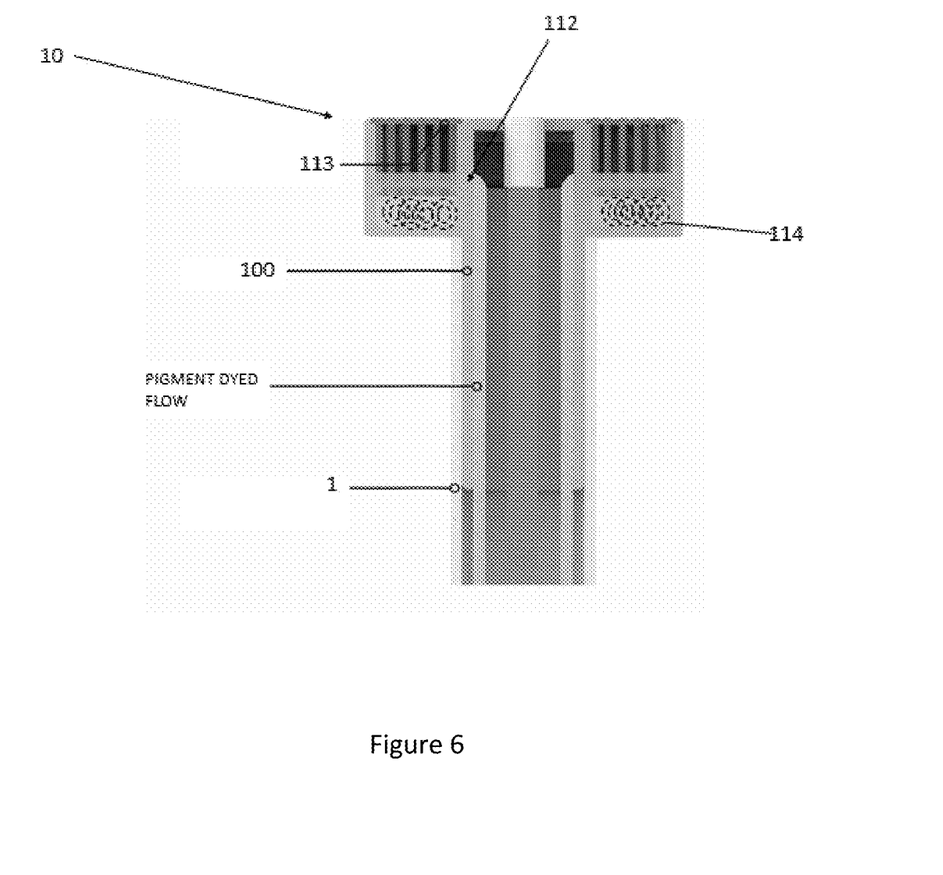
FIG. 6 shows an assembled cross-sectional view of the device installed, according to the present disclosure.
Figure 7:
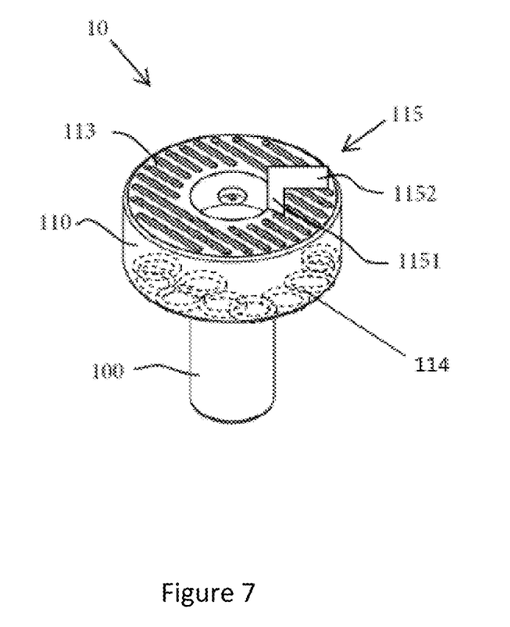
FIG. 7 shows an isometric view of an alternate embodiment of the device, according to the present disclosure.

In an alternate embodiment of the present disclosure, as shown in FIG. 7, the housing 110 includes a stay member 115. The stay member 115 configured to support a ball float assembly in a raised and closed position. The stay member 115 having a vertical portion 1151 and horizontal portion 1152 with the horizontal portion 1152 forming a ledge sized for the resting support of the ball float. The stay member 115 vertical portion 1151 extending parallel to the overflow tube 1 and the horizontal portion 1152 extending perpendicular to the overflow tube 1 in a modified "L-shape", wherein the traditional "L-shape" is rotated clockwise ninety degrees to form the modified "L-shape" of the stay member 115.

In this alternate embodiment, the stay member 115 is configured for movement in the direction corresponding to the vertical portion 1151 an adjustable height, wherein the vertical member 115 is moved into a position corresponding to a height to support the ball float at a level where it can fall no lower.

The stay member 115 can be provided in an adjustable and removable attachment, wherein it is removably received on the cover member 113. Alternately, the stay member 115 can be permanently affixed to the cover member 113. Still alternately, the stay member 115 can include a clip member configured for receipt on the cover member 113 or overflow tube 1.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. An apparatus configured to indicate a leaking toilet flush valve and configured for placement on an overflow tube within a toilet tank, the apparatus comprising:
   a stem portion, the stem portion having a upper portion and a lower portion and extending a height between the upper portion and the lower portion, the stem portion cylindrical and having a diameter sized for receipt within the overflow tube;
   a housing, the housing positioned on the stem portion upper portion and defining a reservoir, the housing configured to capture water prior to entry into the overflow tube, the housing having an interior side aligned with an interior of the overflow tube, the interior side having an aperture, the aperture in fluid communication with the overflow tube interior, wherein the housing is cylindrical and wherein the housing includes a top side, the top side having a cover member, the cover member having a plurality of apertures configured to enable the entry of fluid into the housing; and
   a pigment, the pigment within the reservoir of the housing and configured to color water entering into the housing and exiting into the overflow tube.

2. An apparatus configured to indicate a leaking toilet flush valve and configured for placement on an overflow tube within a toilet tank, the apparatus comprising:
   a stem portion, the stem portion having a upper portion and a lower portion and extending a height between the upper portion and the lower portion, the stem portion cylindrical and having a diameter sized for receipt within the overflow tube;
   a housing, the housing positioned on the stem portion upper portion and defining a reservoir, the housing configured to capture water prior to entry into the overflow tube, the housing having an interior side aligned with an interior of the overflow tube, the interior side having an aperture, the aperture in fluid communication with the overflow tube interior, wherein the housing includes a stay member, the stay member having a vertical portion and a horizontal portion, the stay member configured to provide resting support for a ball float assembly within the toilet tank interior; and
   a pigment, the pigment within the reservoir of the housing and configured to color water entering into the housing and exiting into the overflow tube.

3. A device configured to indicate a leaking toilet flush valve and configured for placement on an overflow tube within a toilet tank, the device comprising:
   a stem portion, the stem portion cylindrical and having a diameter sized for receipt within the overflow tube, the stem portion extending a height between an upper portion and a lower portion;
   a housing, the housing on the upper portion of the stem portion, wherein the housing includes a cover member, the cover member received on the top side and having a plurality of apertures configured to enable the entry of fluid into the housing, and the housing configured as a reservoir within an interior space forming a cavity for the capture of water prior to entry into the overflow tube, the housing comprising:
- an interior side wall, the interior side wall adjacent to an interior of the overflow tube;
- an exterior side wall opposite the interior side wall;
- a bottom side;
- a top side; and
- an aperture, the aperture on the interior side wall adjacent the bottom side, the aperture in fluid communication with the reservoir and overflow tube interior; and a pigment, the pigment within the reservoir and configured to color water entering into the housing.

4. A device configured to indicate a leaking toilet flush valve and configured for placement on an overflow tube within a toilet tank, the device comprising:
- a stem portion, the stem portion cylindrical and having a diameter sized for receipt within the overflow tube, the stem portion extending a height between an upper portion and a lower portion;
- a housing, the housing on the upper portion of the stem portion and configured as a reservoir within an interior space forming a cavity for the capture of water prior to entry into the overflow tube, the housing comprising:
  - an interior side wall, the interior side wall adjacent to an interior of the overflow tube;
  - an exterior side wall opposite the interior side wall;
  - a bottom side;
  - a top side; and
  - an aperture, the aperture on the interior side wall adjacent the bottom side, the aperture in fluid communication with the reservoir and overflow tube interior, wherein the housing includes a stay member, the stay member having a vertical portion and a horizontal portion, the stay member configured to provide resting support for a ball float assembly within the toilet tank interior; and
- a pigment, the pigment within the reservoir and configured to color water entering into the housing.

5. A device configured to indicate a leaking toilet flush valve and configured for placement on an overflow tube within a toilet tank, the device comprising:
- a stem portion, the stem portion is cylindrical and having a diameter sized for receipt within the overflow tube, the stem portion extending a height between an upper portion and a lower portion;
- a housing, the housing cylindrical and on the upper portion of the stem portion and configured as a reservoir forming a cavity for the capture of water prior to entry into the overflow tube, the housing comprising:
  - an interior side wall, the interior side wall adjacent to an interior of the overflow tube;
  - an exterior side wall opposite the interior side wall;
  - a bottom side;
  - a top side;
  - a cover member, the cover member configured for placement on the top side and having a plurality of apertures; and
  - an aperture, the aperture on the interior side wall adjacent the bottom side, the aperture in fluid communication with the reservoir and overflow tube interior; and
- a pigment, the pigment within the reservoir of the housing and configured to color water entering into the housing and exiting the aperture into the overflow tube.

6. A device as in claim 5, wherein the housing includes a stay member, the stay member having a vertical portion and a horizontal portion, the stay member configured to provide resting support for a ball float assembly within the toilet tank interior.

* * * * *